Patented Oct. 27, 1931

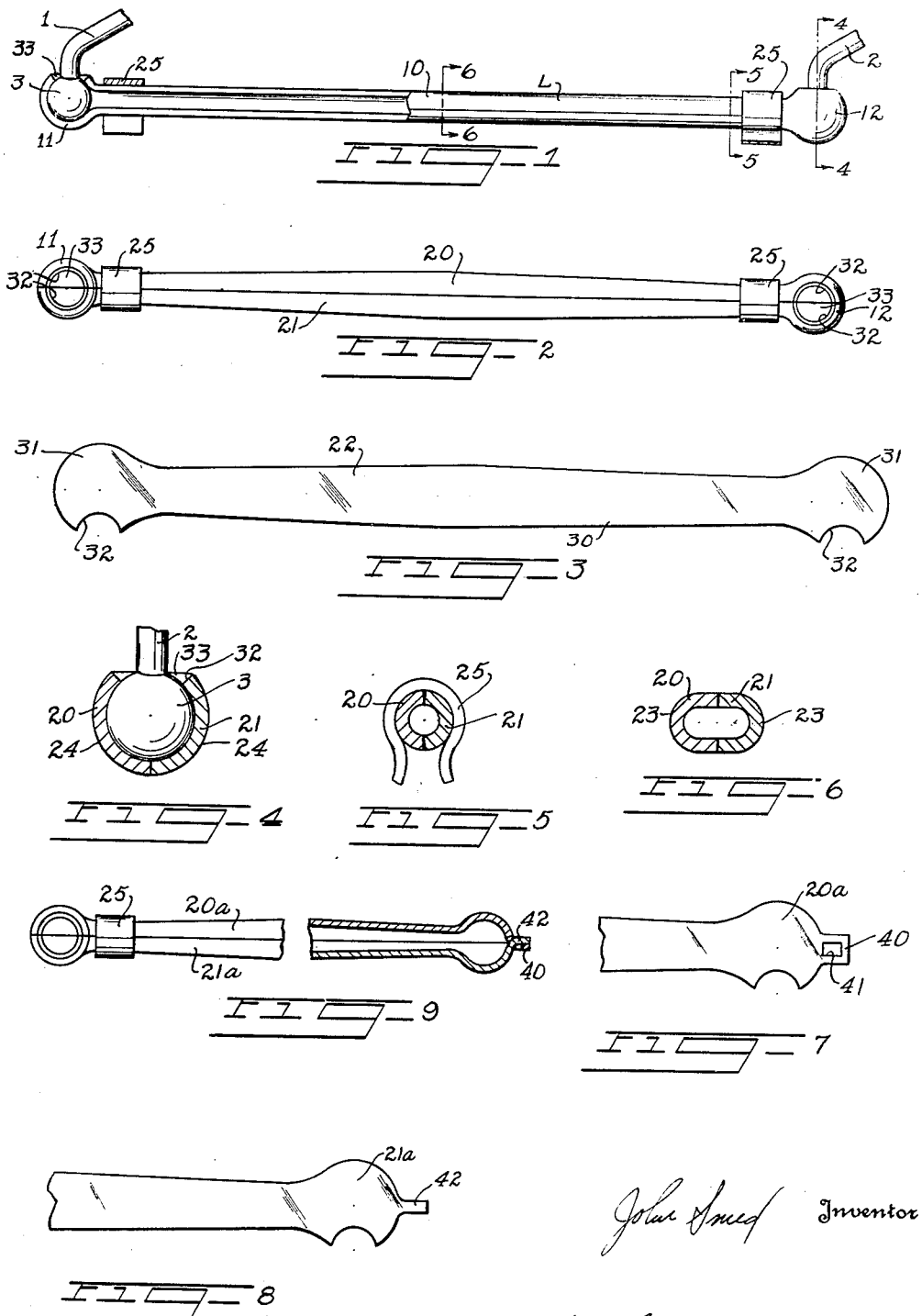

1,829,305

UNITED STATES PATENT OFFICE

JOHN SNEED, OF FERNDALE, MICHIGAN

TIE ROD

Application filed July 2, 1928. Serial No. 289,671.

This invention relates to tie rods or links and to the manner of forming and assembling the same.

In a motor vehicle there are a number of places in and about the vehicle where links or tie rods are used. Among other places are the connections which constitute the control for the carburetor and the distributor head, and which may be considered as one illustrative employment of my invention. It has been common practice to use rods with detachable ball and socket joints at their ends in this control and my invention contemplates the formation of a link or tie rod which may be formed of pressed metal parts, detachably secured together and which can carry loads both in tension or compression. The principles of my invention are applicable to a broader field and the use mentioned above is merely illustrative of one application. It is to be understood that while the duty on such a link is comparatively light, my invention is equally applicable to constructions where the duty is heavier, the strength of my link being largely proportionate to the thickness of the stock from which it is formed.

It is among the objects of my invention to provide a link which may be formed of pressed metal in a simple operation and which may be cheaply produced and readily used. Another object is to form a link with integral cup-shaped ends which may comprise the socket parts of ball and socket joints so that universal movement may be had between the ends of the link and the parts which it connects.

A further object is to arrange a link wherein the sockets may be readily opened so that the link may be easily attached or detached from the parts it connects. Another object is to arrange the links of two complementary parts each of which may be easily formed and may be removably held together. A further object is to detachably secure the parts together by such means as resilient clips.

Other objects will appear from the following description of a preferred form of my invention, reference being had to the accompanying drawings. The essential characteristics are summarized in the claims.

In the drawings, Fig. 1 is a partially broken side elevation of the assembled parts constituting the link and including the arms to which the link is connected; Fig. 2 is a top plan view of the parts constituting the link; Fig. 3 illustrates the blank from which the preferred form of half of my link may be struck; Fig. 4 is a section taken along the line 4—4 of Fig. 1; Fig. 5 is a section taken along the line 5—5 of Fig. 1; Fig. 6 is a section taken along the line 6—6 of Fig. 1; Figs. 7 and 8 illustrate complementary blank parts for forming one end of the modified form of my link; and Fig. 9 is a partially broken longitudinal section of a link formed from the blanks illustrated in Figs. 7 and 8.

Referring particularly to Fig. 1, I illustrate an embodiment of my link L acting as a connecting member between arms 1 and 2. Each of the arms may have spherically formed ends, as shown at 3, which constitute the ball parts of the ball and socket joints arranged at the ends of the link to facilitate universal movement between the link and the arms. The link may constitute a body 10 with hollow substantially spherical ends 11 and 12 which constitute sockets for the ball parts of the arms.

Referring also to Figs. 2 and 3, my link comprises essentially two parts 20 and 21. Each of the parts 20 and 21 may be formed from a blank 22 which is drawn to form a central channel part 23, see Fig. 6, with two substantially hemispherical cup-shaped ends 24, see also Fig. 4. The parts 21 and 22 are placed together with the open faces of the sockets and channels facing each other, and are held together by such means as detachable resilient clips 25, see also Fig. 5. In drawing the channel portion of the parts, the middle may be drawn to greater depth than the parts near the ends to give it strength in resisting columnar loads, see Figs. 5 and 6.

Referring first to Fig. 3 the blank comprises a body part 30 which may have greater width in its mid portion than at the ends to facilitate drawing the middle portion to greater depth than the end portions. The extreme ends of the blank 31 may be substantially disc like so that they may be drawn into hemispherical cups. Each of the disc like ends may be notched as at 32 so that when the parts are formed and placed together, the oppositely facing notches 32, see Fig. 2, define a circular opening 33, see also Figs. 1 and 4, for receiving the shanks of the arms between which the link is connected.

In attaching the link between the two arms, one of the parts, for instance, the part 21, may be held while the spherical ends of the arms 1 and 2 are placed in the half sockets at its ends, then the other part of the link may be laid facing the first part and encompassing the spherical parts of the arms at its ends. While the parts 21 and 22 are manually or otherwise held together with the ball parts encompassed in the cupped ends, clips 25 may be snapped over the ends of the body of the link adjacent the sockets to secure the parts together. The removal of a link consists in detaching the clips 25 and separating the members from each other and from the balls which have been engaged.

Referring particularly to Figs. 7, 8 and 9, I show a slight modification in the manner of holding the two parts together. In Fig. 7 is illustrated a blank 20a which may be similar to the blank 22 except that a lip or tang 40 having an opening 41 is formed on the extreme end of the blank. Another blank 21a may also be similar to the blank 22 except that a tip or tang 42 is formed on the extreme end. When the parts are formed into a channel and with cupped ends, the tangs 40 and 42 extend longitudinally and may be interfitted to secure at least one end of the link together, as illustrated in Fig. 9. With such an arrangement at one end of the link, the parts may be detached by first spreading the opposite ends and spreading the parts until the tang 42 may be withdrawn through the opening 41 of the tang 40. Such tangs might be used on both ends of the link if at least one of the tangs on one end were deformed to hold the parts together. I prefer to use a resilient clip at the other end of such a link to facilitate assembly and attachment.

From the foregoing it will appear that my link may be very economically made and can be readily attached or detached as its use requires; that parts may be made in standardized or selected lengths for different uses; that the sturdy and simple construction lends itself to long and satisfactory service, and while I have illustrated and described a preferred form of my invention, changes within its scope may occur to those skilled in the art, and I do not care to be limited in the scope of my patent other than by the claims appended hereto.

I claim:—

1. A link comprising two like parts each having a central channel section and cupped ends, the parts being removably secured together with the open faces of the channels and cupped ends proximate and lying in one plane and forming substantially full closed sockets in the ends for reception of members having ball parts, and means for holding said first parts together.

2. The combination of an arm having an enlarged spherical end, and a member adapted to be universally connected to said end, said member comprising two parts, each part having a substantially hemispherical socket portion, said parts being adapted to be secured together to form a socket engaging said enlarged spherical end, and means including a removable resilient clip securing said parts together.

3. The combination of an arm having an enlarged spherical end, and a member adapted to be universally connected to said end, said member comprising two parts, each part having a substantially hemispherical socket portion and a longitudinally extending body portion, said parts being secured together to form a socket at one end and engaging said enlarged spherical end, and means including a removable clip for securing said parts together.

4. A link comprising like parts each formed with a central channel portion and cupped ends, said parts being placed together with the edges of the channels and the brims of the cupped ends abutting, and means including a removable clip for securing said parts together.

5. A link comprising like parts each formed with a central channel portion and cupped ends, said parts being placed together with the edges of the channels and the brims of the cupped ends abutting in combination with at least one resilient U-shaped clip securing said parts together.

6. A link formed essentially of two members each pressed from sheet stock having a central channel portion of greater depth in the middle of the link than at the ends thereof and having deformed ends adapted to engage external agencies, said parts being arranged with the edges of the flanges of the channel parts abutting whereby the cross section of the middle portion of the link is greater than the cross section of the parts remote therefrom to lend compressive strength to the link, and means for holding said parts together.

7. A link formed essentially of two members each pressed from sheet stock having a central channel portion of greater depth in the middle of the link than at the ends thereof and having substantially hemispherical cupped ends adapted to engage external agencies, said parts being arranged with the edges of the flanges of the channel parts and the brims of the cupped ends abutting whereby the cross section of the middle portion of the link is greater than the cross section of the parts remote therefrom to lend compressive strength to the link, and means for holding said parts together.

8. A link comprising essentially two parts each pressed from sheet stock to have a middle body portion with an integral substantially hemispherical cupped end with substantially circular brims, the brims of the cupped ends being notched, the parts being secured together with the brims of the cups in abutment and with the notched portions juxtaposed to form a substantially spherical socket with an aperture defined by said notches.

9. A link comprising essentially two parts each pressed from sheet stock to have a channeled body portion and substantially hemispherical cupped ends with substantially circular brims, the brims of the cupped ends being arcuately notched, the parts being positioned together with the brims of the cups in abutment and with the notched portions juxtaposed to form substantially spherical sockets with a circular aperture defined by said notches, and means for holding said parts together.

10. A link or tie rod comprising essentially two complementary parts removably secured together and abutting each other along the plane of the longitudinal axis of the link and means for detachably securing said parts together including a resilient U-shaped clip with the portions comprising the legs of the U arranged substantially parallel to said plane.

11. A link or tie rod having a body part tapering toward one end and having an enlarged end portion adjacent the most slender part of the body and comprising essentially two complementary parts removably secured together and abutting each other along a longitudinal plane, and means for detachably securing said parts together including a resilient U-shaped clip with the portions comprising the legs of the U arranged substantially parallel to said plane and engaging the body of the link at the slenderest part thereof.

12. A link or tie rod comprising two longitudinally extending parts each having substantially hemispherical cupped ends with circular brims, the parts being placed together with the cupped ends juxtaposed to form substantially spherical sockets, the brims of one pair of cupped ends having interfitting tangs for securing them together, and a clip positioned near the other end of the link for securing the parts at that end together.

13. The combination of a ball having a shank and a member universally connected to said ball comprising a pair of pressed metal parts each having a hemispherical cupped portion with notches in the brims thereof, said parts being removably secured together with the notches in the brims of adjacent cupped portions juxtaposed whereby the cupped shaped parts embrace said ball and the shank of the ball extends through the opening formed by said juxtaposed notches, and means for removably securing said parts together including a U-shaped clip with the legs of the U extending substantially parallel with the plane of the brims of said cups.

14. A link or tie rod comprising two longitudinally extending equal halves, each having a channeled body portion of U section in the middle and tapering to half circular section near the ends of the channeled body portion and each half having substantially hemispherical cupped ends with brims in the plane of the edges of the channeled body portion, and means for securing said halves together in juxtaposition including at least one U-shaped clip having a substantially circular base engaging said halves near the end of the channeled body portion.

15. A link or tie rod comprising two longitudinally extending parts each having substantially hemispherical cupped ends with circular brims, the parts being placed together with the cupped ends juxtaposed to form substantially spherical sockets, the brims of one pair of cupped ends having interfitting tangs for securing them together, and securing means positioned near the other end of the link.

16. A link or tie rod comprising two longitudinally extending equal halves, each having a channeled body portion of U section in the middle and tapering to half circular section near the ends of the channeled body portion and each half having substantially hemispherical cupped ends with brims in the plane of the edges of the channeled body portion whereby portions of minimum external dimension exist inwardly adjacent said cupped ends, and means substantially encircling said juxtaposed halves for holding them together positioned at said portions of minimum external dimension.

In testimony whereof, I hereunto affix my signature.

JOHN SNEED.